United States Patent
Lee et al.

(10) Patent No.: US 8,543,333 B2
(45) Date of Patent: Sep. 24, 2013

(54) METHOD, SYSTEM, APPARATUS AND COMPUTER-READABLE MEDIUM FOR BROWSING SPOT INFORMATION

(75) Inventors: Po-Yen Lee, Taoyuan County (TW); Chien-Wen Chen, Taoyuan County (TW); Pai-Chang Yeh, Taoyuan County (TW); Li-Wen Lian, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 287 days.

(21) Appl. No.: 13/039,314

(22) Filed: Mar. 3, 2011

(65) Prior Publication Data

US 2012/0059576 A1    Mar. 8, 2012

Related U.S. Application Data

(60) Provisional application No. 61/310,247, filed on Mar. 3, 2010, provisional application No. 61/324,303, filed on Apr. 15, 2010.

(51) Int. Cl.
*G01C 21/00* (2006.01)
*G08G 1/123* (2006.01)

(52) U.S. Cl.
USPC ........... 701/454; 701/409; 701/431; 701/532; 701/537; 701/538; 715/764; 715/779; 715/786; 715/787

(58) Field of Classification Search
USPC ................. 701/400, 408, 409, 431, 432, 436, 701/438, 454, 458, 459, 461, 523, 526, 532, 701/537, 538, 540, 541; 705/14.53, 14.54, 705/14.55, 14.57, 14.58, 14.66, 14.67; 715/764, 715/769, 779, 786, 787, 800
See application file for complete search history.

(56) References Cited

U.S. PATENT DOCUMENTS

| | | | |
|---|---|---|---|
| 7,389,181 B2 * | 6/2008 | Meadow et al. | 701/522 |
| 7,555,725 B2 * | 6/2009 | Abramson et al. | 715/781 |

(Continued)

FOREIGN PATENT DOCUMENTS

CN     101082912 A    12/2007

OTHER PUBLICATIONS

Carboni, D., Sanna, S., Zanarini, P., "GeoPix: Image Retrieval on the Geo Web, From Camera Click to Mouse Click", MOBILEHCI'06, Helsinki (Finland)/ACM, 2 Penn Plaza, Suite 701—New York USA, Sep. 15, 2006, XP040046280, p. 169-p. 172.
Google Inc., "Navigate our way through user photos in street View", http://google-latlong.blogspot.com/2010/02/navigate-your-way-through-userphotos.html, Feb. 26, 2010, XP5500260, p. 1-p. 4.

(Continued)

*Primary Examiner* — Rami Khatib
(74) *Attorney, Agent, or Firm* — Jianq Chyun IP Office

(57) ABSTRACT

A method, a system, an apparatus, and a computer-readable medium for browsing spot information, adapted to an electronic device, are provided. In the present method, a plurality of spot information are retrieved, in which each of the spot information at least comprises a picture and a location of a spot. Next, an electronic map is displayed and a spot marker is marked at the spot location of each spot information on the electronic map. Meanwhile, a spot browsing bar is displayed on a side of the electronic map and the spot pictures of the spot information are sequentially displayed in the spot browsing bar. When a select operation of a certain spot marker on the electronic map is received, the spot browsing bar is scrolled to show the spot picture corresponding to the selected spot marker.

20 Claims, 11 Drawing Sheets

(56) References Cited

U.S. PATENT DOCUMENTS

| | | | |
|---|---|---|---|
| 7,587,276 B2* | 9/2009 | Gold et al. | 701/426 |
| 8,229,660 B2* | 7/2012 | Sugimoto | 701/532 |
| 2006/0111839 A1 | 5/2006 | Han | |
| 2008/0098316 A1* | 4/2008 | Declan | 715/764 |
| 2008/0147730 A1 | 6/2008 | Lee et al. | |
| 2008/0281519 A1* | 11/2008 | Miyata | 701/213 |
| 2009/0177386 A1* | 7/2009 | Haase | 701/209 |
| 2009/0319181 A1* | 12/2009 | Khosravy et al. | 701/208 |
| 2009/0327078 A1 | 12/2009 | Ohazama et al. | |
| 2009/0327275 A1* | 12/2009 | Walker et al. | 707/5 |
| 2010/0035596 A1* | 2/2010 | Nachman et al. | 455/418 |
| 2010/0082437 A1* | 4/2010 | Tamayama et al. | 705/14.58 |
| 2010/0191459 A1* | 7/2010 | Carter et al. | 701/208 |
| 2011/0055187 A1* | 3/2011 | Cai et al. | 707/706 |

OTHER PUBLICATIONS

Ahern, S., King, S., Naaman, M. and Nair R., "Summarization of Online Image Collections via Implicit Feedback", WWW2007 BANFF (Canada) / ACM, 2 Penn Plaza, Suite 701—New York USA, May 12, 2007, XP040060319, p. 1325-p. 1326.

"Search Report of European counterpart application", issued on Jul. 22, 2011, p. 1-p. 5.

"Second Office Action of European Counterpart Application", issued on Feb. 20, 2012, p. 1-p. 7.

Wikipedia: "Panoramio", http://en.wikipedia.org/w/index.php?title=Panoramio&oldid=347154496, retrieved on Jan. 25, 2012, XP007920147, p. 1-p. 2.

"First Office Action of China Counterpart Application", issued on Jun. 5, 2012, p. 1-p. 6.

* cited by examiner

Create a Footprint

Untitled

Address

Add a photo

☐ Private

Phone number

GPS location

LOCATE

47° 35' 58.48" N, 122° 19' 52.75" W

Choose your categories
☐ Favorites ☐ Community ☐ Leisure ☐ Transit
☐ Attraction ☐ Dining ☐ Recreation ☐ Cat X
☐ Business ☐ Entertainment ☐ Shopping Website Notes

OK    CANCEL

FIG. 7

METHOD, SYSTEM, APPARATUS AND COMPUTER-READABLE MEDIUM FOR BROWSING SPOT INFORMATION

CROSS-REFERENCE TO RELATED APPLICATION

This application claims the priority benefits of U.S. provisional application No. 61/310,247, filed on Mar. 3, 2010 and U.S. provisional application No. 61/324,303, filed on Apr. 15, 2010. The entirety of each of the above-mentioned patent applications is hereby incorporated by reference herein and made a part of this specification.

BACKGROUND

In recent years, with development and improvement of electronic technology and communication techniques, electronic devices occupying less space and easy to carry such as cellular phones and smart phones, etc. are quickly developed. Generally, multiple functions are integrated to mobile devices in the market to improve competitiveness thereof, and besides general camera, phone call and Internet access functions, a global positioning system (GPS) and an electronic map are also integrated to a handheld communication device, and a user can take pictures of surrounding objects by using the camera function of the mobile device at any time, and can also learn a location of himself through a positioning function of the mobile device.

By integrating the camera and the positioning function, the user can use the mobile device to capture and edit pictures, coordinates and addresses of travelling spots to obtain a plurality of spot information for future looking up. If the Internet access function is further integrated, the user can further upload the edited spot information to a social network website or a spot sharing website for sharing the spot information to other members.

However, as the social network website and the spot sharing website are popularized, shared information on the website is large and complex, which generally causes reading difficulty, so that it is necessary to provide a simple and intuitive interface for the user to easily browse the spot information, and edit and share the spot information according to personal requirements.

SUMMARY

The application is directed to a method, a system, and an apparatus for browsing spot information, which facilitates a user to browse, edit, and share the spot information.

The application provides a method for browsing spot information, which is adapted to an electronic device. In the present method, a plurality of spot information is retrieved, where each of the spot information at least comprises a spot picture and a spot location of a spot. Next, an electronic map is displayed and a spot marker is marked at the spot location of each spot information on the electronic map. Meanwhile, a spot browsing bar is displayed on a side of the electronic map and the spot pictures of the spot information are sequentially displayed in the spot browsing bar. When a select operation of a certain spot marker on the electronic map is received from a user, the spot browsing bar is scrolled to show the spot picture corresponding to the selected spot marker.

In an example, the step of retrieving the spot information comprises connecting a website to retrieve spot information shared by a plurality of members of the website.

In an example, each spot information further comprises a spot name of the spot and a member picture of the member sharing the spot information.

In an example, the step of sequentially displaying the spot pictures of the spot information in the spot browsing bar further comprises marking a spot name of each spot information near the spot picture, and displaying the member picture of the member sharing the spot information at a corner of the spot picture.

In an example, when the select operation of a certain spot marker on the electronic map is received from the user, the method further comprises extendedly displaying a spot note block from the selected spot marker, where the spot note block displays the spot picture corresponding to the selected spot marker.

In an example, the spot note block further displays one of a spot name, a category, an address, a phone number, and a website of the spot information, a name and a picture of a member sharing the spot information, and a creation date of the spot information, or a combination thereof.

In an example, the spot note block further displays an add option to facilitate the user adding the spot information to be a favorite spot, and displays a send option to facilitate the user sending the spot information to other members or contacts.

In an example, after the step of extendedly displaying the spot note block from the selected spot marker, the method further comprises displaying a spot information editing block to facilitate the user editing the spot information when a select operation of the add option in the spot note block is received from the user, and adding the edited spot information to be a favorite spot of the user when a select operation of an OK option in the spot information editing block is received from the user.

In an example, the step of scrolling the spot browsing bar to show the spot picture corresponding to the selected spot marker comprises scrolling the spot browsing bar to scroll the spot picture corresponding to the selected spot marker to a display area of the spot browsing bar.

In an example, the step of scrolling the spot browsing bar to show the spot picture corresponding to the selected spot marker comprises framing the spot picture corresponding to the selected spot marker by an outer frame, or highlighting the spot picture corresponding to the selected spot marker by darkening other spot pictures in the spot browsing bar.

In an example, after the step of displaying the electronic map and the spot browsing bar, the method further comprises when a select operation of one of the spot pictures in the spot browsing bar is received from a user, shifting a display area of the electronic map to locate the spot marker corresponding to the selected spot picture at a center of the electronic map.

In an example, after the step of displaying the electronic map and the spot browsing bar, the method further comprises receiving a select operation of a locate option from the user to control a mobile device connected to the electronic device to execute a positioning function to obtain a current location of the mobile device, and marking the current location of the mobile device on the electronic map by a device marker, and shifting a display area of the electronic map to locate the device marker at a center of the electronic map.

In an example, after the step of displaying the electronic map and the spot browsing bar, the method further comprises receiving a select operation of an add option from the user to control a mobile device connected to the electronic device to execute a positioning function to obtain a current location of the mobile device, and displaying a spot information editing block and marking the current location of the mobile device on the electronic map in the spot information editing block by a device marker, and shifting a display area of the electronic map to locate the device marker at a center of the electronic map.

The application provides an apparatus for browsing spot information comprising a display module, a spot information retrieving module, an electronic map module, a spot browsing bar module, and an input module. The spot information retrieving module is used for retrieving a plurality of spot information, where each of the spot information at least comprises a spot picture and a spot location of a spot. The electronic map module is used for displaying an electronic map on the display module, and marking a spot marker at the spot location of each spot information on the electronic map. The spot browsing bar module is used for displaying a spot browsing bar on a side of the electronic map and sequentially displaying the spot pictures of the spot information in the spot browsing bar. The input module is used for receiving a select operation from a user. When the input module receives the select operation of a certain spot marker on the electronic map displayed by the electronic map module from the user, the spot browsing bar module scrolls the spot browsing bar to show the spot picture corresponding to the selected spot marker.

In an example, the spot information retrieving module is connected to a website to retrieve spot information shared by a plurality of members of the website.

In an example, the spot browsing bar module further marks a spot name of each spot information near the spot picture, and displays the member picture of the member sharing the spot information at a corner of the spot picture.

In an example, the apparatus for browsing spot information further comprises a spot note module, where when the input module receives the select operation of a certain spot marker on the electronic map from the user, the spot note module extendedly displays a spot note block from the selected spot marker, and the spot note block displays the spot picture corresponding to the selected spot marker.

In an example, the spot note module further displays one of a spot name, a category, an address, a phone number, and a website of the spot information, a name and a picture of a member sharing the spot information, and a creation date of the spot information, or a combination thereof in the spot note block.

In an example, the spot note module further displays an add option in the spot note block to facilitate the user adding the spot information to be a favorite spot, and displays a send option in the spot note block to facilitate the user sending the spot information to other members or contacts.

In an example, the spot note module further comprises a spot information editing module, which is used for displaying a spot information editing block to facilitate the user editing the spot information when the input module receives the select operation of the add option in the spot note block from the user, and adding the edited spot information to be a favorite spot of the user when the input module receives the select operation of an OK option in the spot information editing block from the user.

In an example, when the input module receives the select operation of a certain spot marker on the electronic map displayed by the electronic map module from the user, the spot browsing bar module scrolls the spot browsing bar to scroll the spot picture corresponding to the selected spot marker to a display area of the spot browsing bar.

In an example, when the input module receives the select operation of a certain spot marker on the electronic map displayed by the electronic map module from the user, the spot browsing bar module further frames the spot picture corresponding to the selected spot marker by an outer frame, or highlights the spot picture corresponding to the selected spot marker by darkening other spot pictures in the spot browsing bar.

In an example, when the input module receives a select operation of a certain spot picture in the spot browsing bar from a user, the electronic map module shifts a display area of the electronic map to locate the spot marker corresponding to the selected spot picture at a center of the electronic map.

In an example, the apparatus for browsing spot information further comprises a connection unit and a control module. The connection unit is used for connecting a mobile device, and the control module is used for controlling the mobile device to execute a positioning function to obtain a current location of the mobile device when the input module receives the select operation of a locate option from the user. The electronic map module further marks the current location of the mobile device on the electronic map by a device marker, and shifts a display area of the electronic map to locate the device marker at a center of the electronic map.

In an example, the apparatus for browsing spot information further comprises a connection unit, a control module, and a spot information editing module. The connection unit is used for connecting a mobile device, and the control module is used for controlling the mobile device to execute a positioning function to obtain a current location of the mobile device when the input module receives a select operation of a locate option from the user. The spot information editing module is used for displaying a spot information editing block, marking the current location of the mobile device on the electronic map in the spot information editing block by a device marker, and shifting a display area of the electronic map to locate the device marker at a center of the electronic map.

The application provides a computer-readable medium, which records a computer program to be loaded into a mobile device to execute the aforementioned method for browsing spot information. The computer program is basically composed of a plurality of program instructions (for example, an organization chart establishing program instruction, a table approving program instruction, a setting program instruction, and a deployment program instruction, etc), and these program instructions are loaded into the mobile device and executed by the same to accomplish various steps of the method for browsing spot information and various functions of the apparatus for browsing spot information described above.

According to the above descriptions, in the method, the system, the apparatus, and the computer-readable medium for browsing spot information of the application, by marking the spot information shared by multi members on the electronic map in collaboration with the spot browsing bar capable of displaying the spot pictures, the user can conveniently select the interested spot, and browse, edit, and share related information of the spot.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

FIG. 7 is an example of a spot information editing block according to an example of the application.

DESCRIPTION OF THE EXAMPLES

In the application, a scrollable spot browsing bar is used to display pictures of a plurality of spot information, and a spot marker is marked on an electronic map according to a spot location recorded by each spot information, so that a user may learn a relative location of each spot on the electronic map. Moreover, the application further provides a two-way interactive interface to enable the user to browse, edit, and share the spot information by selecting the spot marker on the electronic map or selecting the spot picture in the spot browsing bar.

Figure 1:
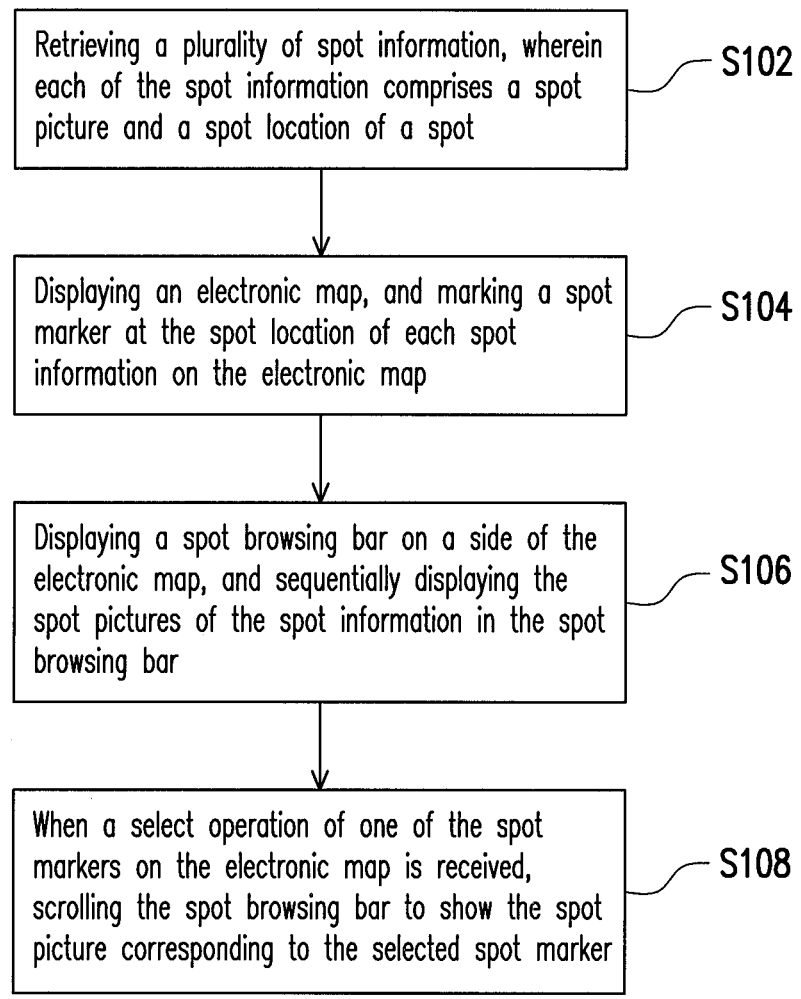
FIG. 1 is a flowchart illustrating a method for browsing spot information according to an example of the application.

FIG. 1 is a flowchart illustrating a method for browsing spot information according to an example. Referring to FIG. 1, the method of the present example is adapted to an electronic device having a display screen, such as a desktop computer, a notebook computer, a flat panel computer, or a smart phone. Through displaying the electronic map and the spot browsing bar, the user can conveniently browse spot information. The method for browsing the spot information is described in detail below.

First, the electronic device retrieves a plurality of spot information (step S102), in which the spot can be any place such as a famous scenic site, a restaurant, a school, a hospital, a gas station, a shop, or a building, etc., or an address or a latitude and longitude set by the user. Each of the spot information at least records a spot picture and a spot location of a spot. In an example, the spot information further comprises a spot name and a picture of a member sharing the spot information. In detail, the electronic device can be connected to a website, for example, a social network website or a spot sharing website, etc. through a network to retrieve the spot information shared by a plurality of members in the website. Furthermore, the electronic device can also be connected to a mobile device of the user through a wired or a wireless approach to retrieve the spot information stored in the mobile device.

Next, the electronic device displays an electronic map on the screen and marks a spot marker at the spot location of each spot information on the electronic map (step S104). In an example, the electronic device may adjust the area covered by the displayed electronic map according to the spot locations of the spot information, so as to display all of the spots in the same electronic map. In another example, the electronic device may also control the connected mobile device to execute a positioning function to obtain a current location, so as to display the electronic map of a specific range around the current location, and mark all of the spots in the coverage area of the electronic map.

Besides displaying the electronic map, the electronic device further displays a spot browsing bar on a side (for example, on the top) of the electronic map and sequentially displays the spot pictures of the spot information in the spot browsing bar (step S106). In another example, besides the spot pictures, the electronic device may also mark the spot name of each spot information near (for example, below) the spot picture, and display the picture of the member sharing the spot information at a corner (for example, a lower right corner) of the spot picture.

Figure 2:
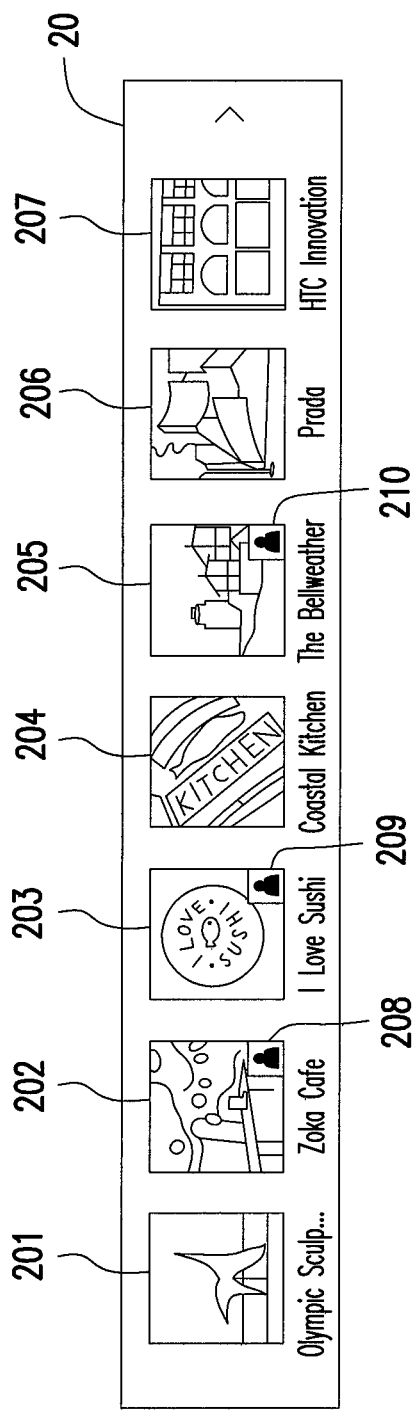
FIG. 2 is an example of a spot browsing bar according to an example of the application.

FIG. 2 is an example of the spot browsing bar according to an example of the application. Referring to FIG. 2, the spot browsing bar 20 of the present example displays spot pictures 201-207 of seven different spots, and the corresponding spot names are marked below the spot pictures 201-207. Moreover, pictures 208, 209, and 210 of the members sharing the spot information are further displayed at the lower right corners of the spot pictures 202, 203, and 205 for reference. A scrolling arrow is further displayed at the right side of the spot browsing bar 20 to facilitate the user scrolling the spot browsing bar 20 to browse other spot pictures that are not displayed.

While displaying the electronic map and the spot browsing bar, the electronic device may receive an operation of the user performed on the electronic map or the spot browsing bar through an input device, for example a keyboard and a mouse, etc. When the electronic device receives a select operation of a certain spot marker on the electronic map from the user, the electronic device correspondingly scrolls the spot browsing bar to show the spot picture corresponding to the selected spot marker (step S108). In detail, the spot picture shown in the spot browsing bar corresponds to the selected spot marker in the electronic map, so that each time when the user selects a spot marker in the electronic map, the electronic device scrolls the spot browsing bar to the spot picture corresponding to the selected spot marker.

It should be noticed that when the electronic device receives the select operation of a certain spot marker on the electronic map from the user, a spot note block may be extendedly displayed from the selected spot marker, and the spot picture corresponding to the selected spot marker is displayed therein. In an example, the spot note block further displays one of a spot name, a category, an address, a phone number, and a website corresponding to the selected spot marker, a name and a picture of the member sharing the spot information, and a creation date of the spot information, or a combination thereof to facilitate the user learning all related information of the spot. Moreover, in another example, the spot note block further displays an add option to facilitate the user adding the spot information to be a favorite spot, and displays a send option to facilitate the user sending the spot information to other members or other contacts.

Figure 3A:
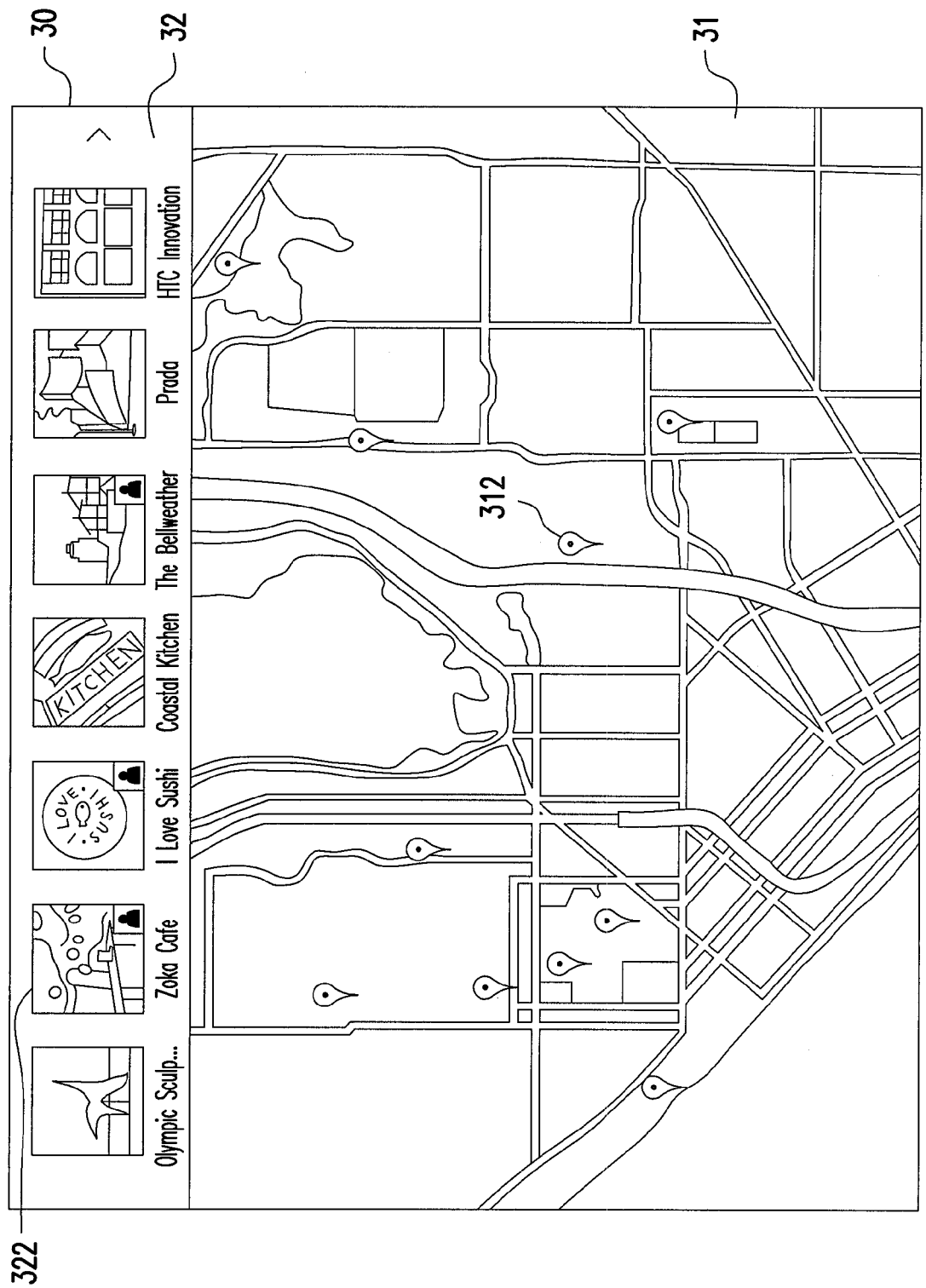
FIGS. 3A, 3B and 3C are examples of a spot information browsing interface according to an example of the application.
Figure 3B:
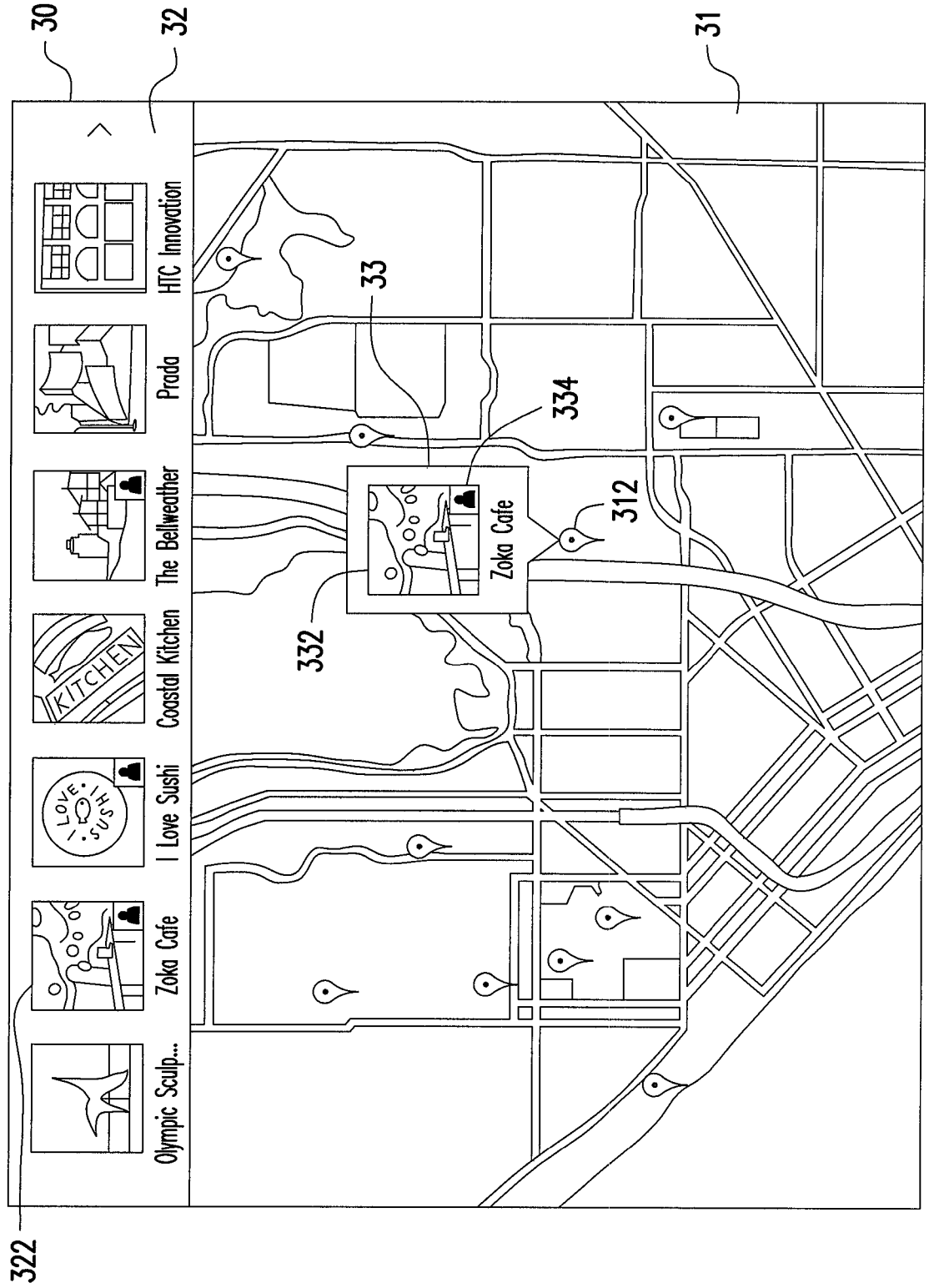
Figure 3C:
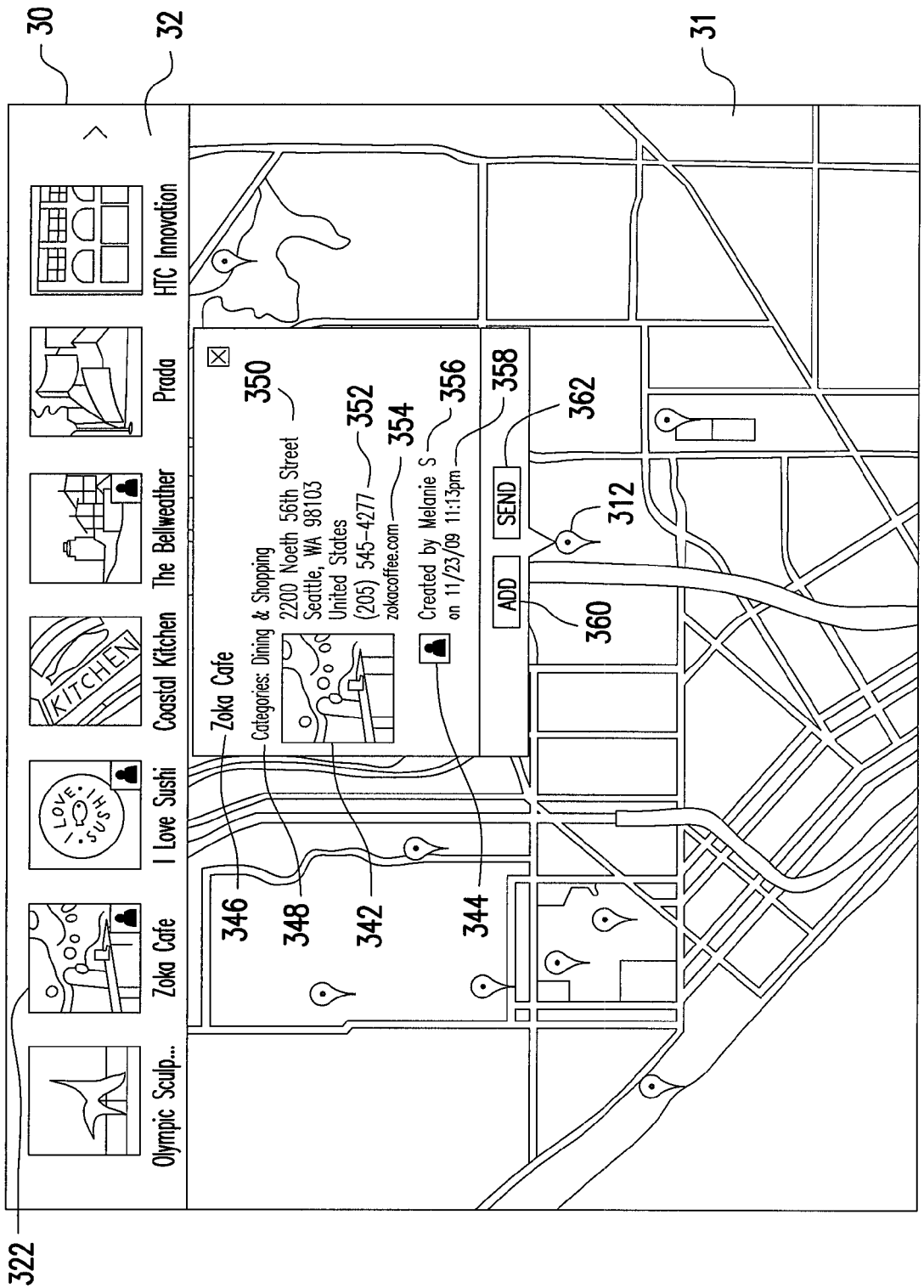

FIGS. 3A, 3B, and 3C are examples of a spot information browsing interface according to an example of the application. Referring to FIG. 3A, the spot information browsing interface 30 of the present example comprises an electronic map 31 and a spot browsing bar 32, where the electronic map 31 comprises a plurality of spot locations marked by a plurality of spot markers, for example, a spot marker 312, and the spot browsing bar 32 displays a plurality of spot pictures, for example, a spot picture 322 for representing the spots appeared in the electronic map 31. These spot pictures are, for example, arranged in the spot browsing bar 32 according to the creation dates thereof or an alphabet sequence of the spot names. According to sizes of the displayed spot pictures, the spot browsing bar 32 can display a certain number of the spot pictures. If the number of the spot pictures exceeds a limitation, the spot browsing bar 320 is changed into a form of a scrolling bar, and scrolling arrows are displayed at two ends thereof to facilitate the user clicking to scroll the spot browsing bar 32.

Referring to FIG. 3B, when the user selects the spot marker 312 in the electronic map 31, the electronic device marks the spot picture 322 corresponding to the spot marker 312 in the spot browsing bar 32. In an example, if the spot picture corresponding to the selected spot marker is already displayed in the spot browsing bar 32, the spot picture is framed by an outer frame or marked by other approaches. In another example, if the spot picture corresponding to the selected spot marker is not displayed in the spot browsing bar 32, the spot browsing bar 32 is automatically scrolled to show the spot picture corresponding to the selected spot marker. Moreover, the electronic device extendedly displays a spot note block 33 from the spot marker 312 selected by the user, and displays the spot picture 322 corresponding to the spot marker 312 and a picture 334 of the member sharing the spot information in the spot note block 33.

Referring to FIG. 3C, when the user selects the spot marker 312 in the electronic map 31, besides marking the spot picture 322 corresponding to the spot marker in the spot browsing bar 32, the electronic device further extendedly displays a spot note block 34 from the spot marker 312 selected by the user. Besides displaying a spot picture 342 corresponding to the spot marker 312 and a picture 344 of the member sharing the spot information in the spot note block 34, the spot note block 34 further displays a spot name 346, a category 348, an address 350, a phone number 352, a website 354, a name 356 of the member sharing the spot information, and a creation date 358 of the spot information for reference.

It should be noticed that when the electronic device receives a select operation of a certain spot picture in the spot browsing bar from the user, the electronic device shifts a display area of the electronic map to locate the spot marker corresponding to the selected spot picture in the electronic map or locate the spot marker at a center of the electronic map. Moreover, the electronic device may also extendedly display a spot note block from the spot marker for providing detailed information of the spot to the user.

According to the above method for browsing the spot information, the user can click any spot marker on the electronic map or click any spot picture in the spot browsing bar to control the electronic device to display the corresponding spot information. In this way, the user can conveniently browse the spot information.

Beside marking the spot marker and displaying the spot note block, the application further provides a spot information editing block to facilitate the user to further edit the spot information and add the spot of interest to be a favorite spot.

Figure 4:
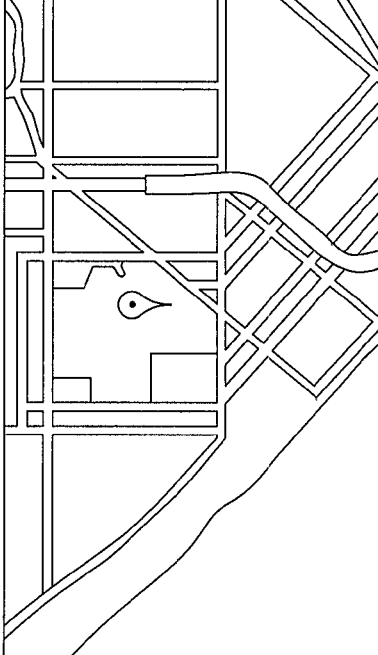
FIG. 4 is an example of a spot information editing block according to an example of the application.

FIG. 4 is an example of a spot information editing block according to an example of the application. Referring to FIG. 3C and FIG. 4, the spot note block 34 of FIG. 3C displays an add option 360 and a send option 362. When the electronic device receives a select operation of the add option 360 from the user, it displays a spot information editing bock 40, in which the spot information editing block 40, for example, overlap on the spot information browsing interface 30. The spot information editing block 40 comprises a plurality of editing fields of the spot information to facilitate the user editing various information.

In detail, in the spot information editing block 40, editing fields of a spot name 402, a picture 404, an address 406, a phone number 408, a category 410, a website 412, and a note 414, etc. are displayed to facilitate the user editing the spot information. The spot information editing block 40 also displays an electronic map 416, coordinates 418 to indicate the spot location, and displays an OK option 420 and a cancel option 422. When the electronic device receives a select operation of the OK option 420 from the user, it adds the spot information edited by the user to be a user's favorite spot, and when the electronic device receives a select operation of the cancel option 422 from the user, it closes the spot information editing block 40.

In another example, a locate option is further displayed on the spot information browsing interface or the spot information editing block to facilitate the user to obtain coordinates of a current location of the mobile device and mark the current location in the electronic map for browsing and editing. Another example is provided below for further descriptions.

Figure 5:
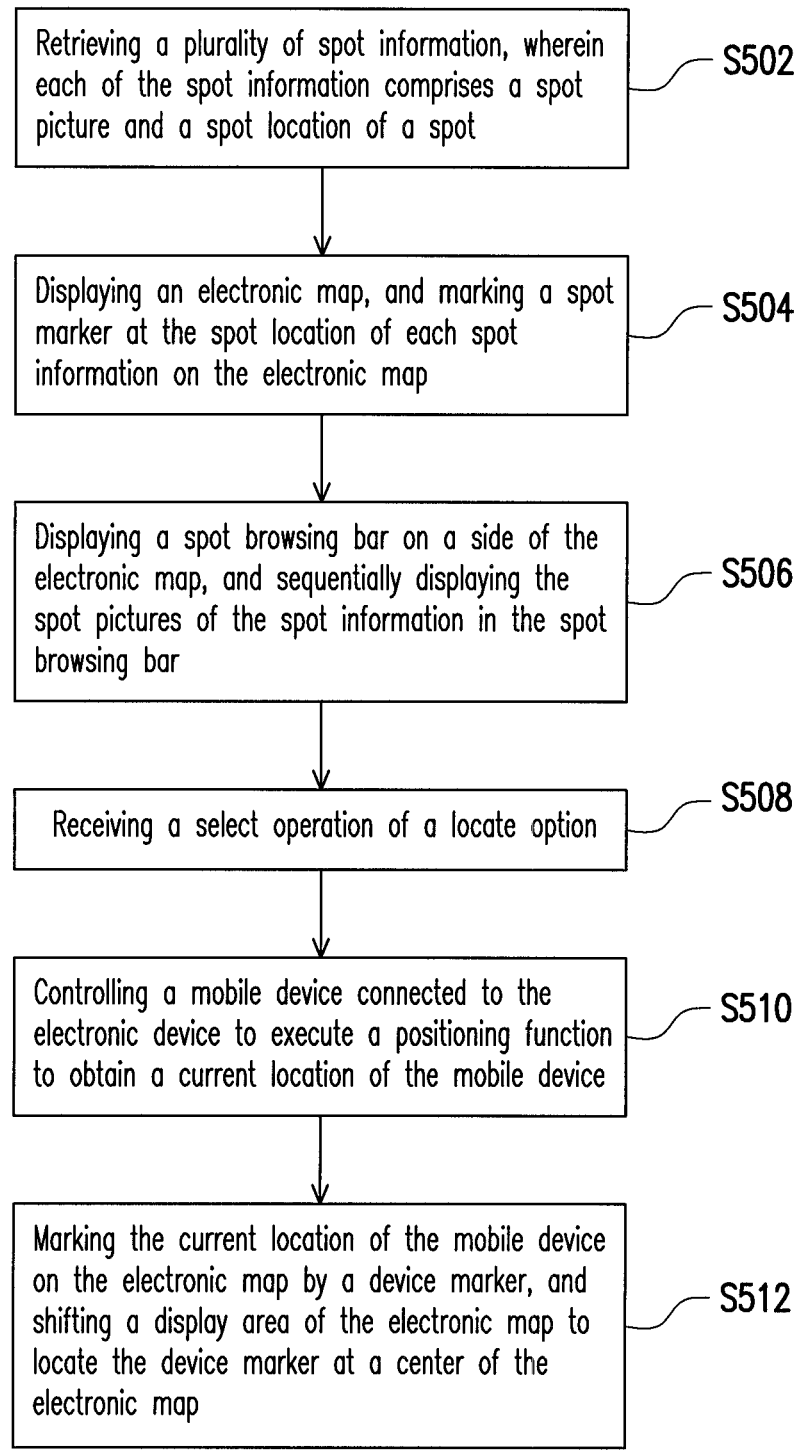
FIG. 5 is a flowchart illustrating a method for browsing spot information according to an example of the application.

FIG. 5 is a flowchart illustrating a method for browsing spot information according to an example of the application. In the present example, the current location of the user is marked in the electronic map to facilitate the user to edit the current location as the spot information, and detailed steps of the method are described below.

First, the electronic device retrieves a plurality of spot information (step S502), where each of the spot information at least records a spot picture and a spot location of a spot. Then, the electronic device displays an electronic map on the screen and marks a spot marker at the spot location of each spot information on the electronic map (step S504). Moreover, the electronic device further displays a spot browsing bar on a side (for example, on the top) of the electronic map and sequentially displays the spot pictures of the spot information in the spot browsing bar (step S106). The above steps S502-S506 are the same as or similar to the steps S102-S106 of the aforementioned example, so that detailed descriptions thereof are not repeated.

Different to the aforementioned example, a locate option is further displayed on the electronic map, and when the electronic device receives a select operation of the locate option from the user (step S508), it controls the mobile device connected to the electronic device to execute a positioning function to obtain the current location of the mobile device (step S510). In detail, the mobile device is, for example, a mobile phone, a personal digital assistant, a smart phone, or a navigation device having the positioning function, which is connected to the electronic device for providing locating information of the current location of the user. When the user wants to edit the current location as the spot information, he/she can select the locate option to control the mobile device to execute the positioning function.

After the current location is obtained, the electronic device marks the current location of the mobile device on the electronic map by a device marker, and shifts a display area of the electronic map to locate the device marker at a center of the electronic map (step S512).

Figure 6:
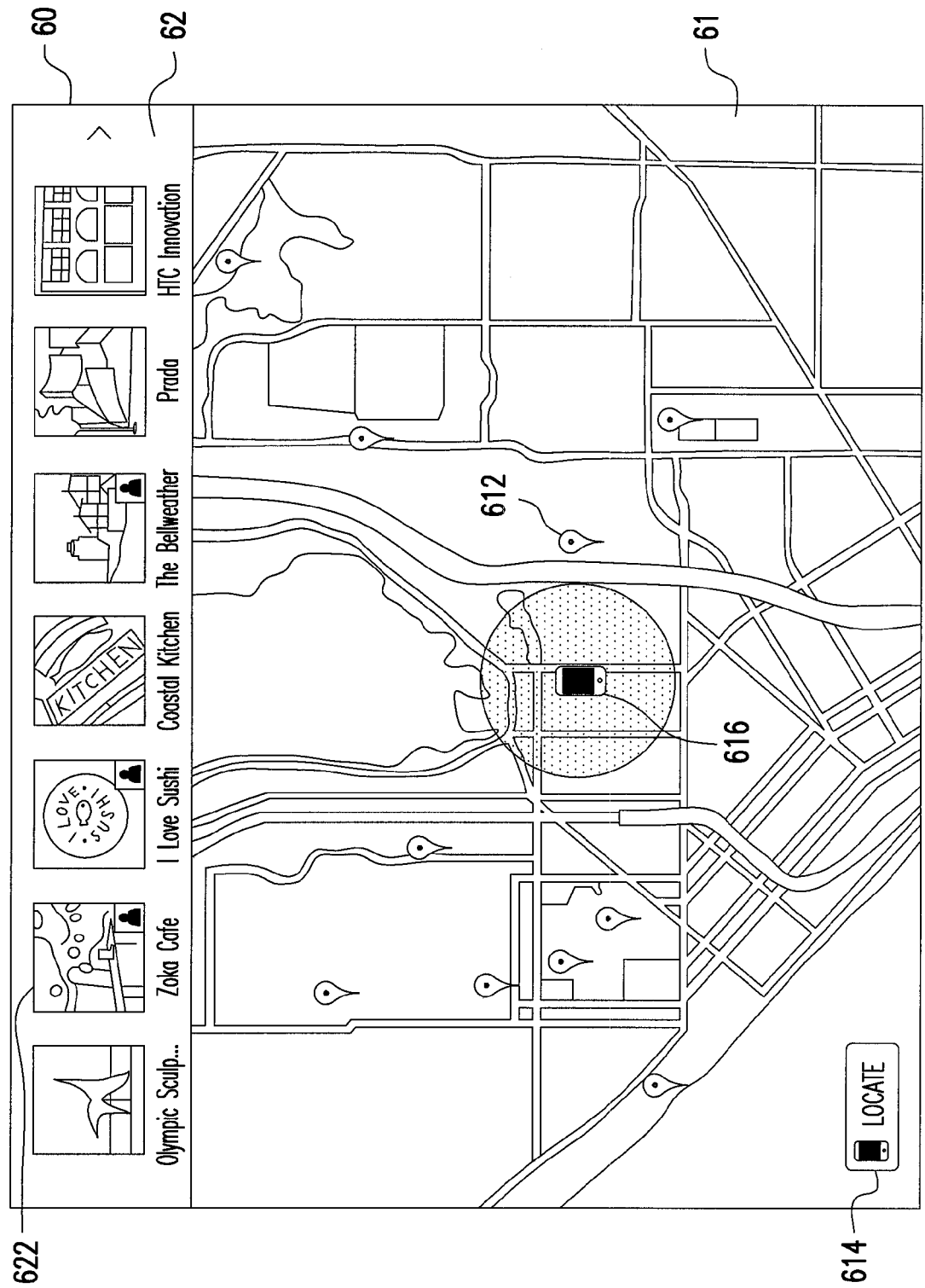
FIG. 6 is an example of a spot information browsing interface according to an example of the application.

For example, FIG. 6 is an example of a spot information browsing interface according to an example of the application. Referring to FIG. 6, the spot information browsing interface 60 comprises an electronic map 61 and a spot browsing bar 62. The electronic map 61 comprises a plurality of spot locations marked by a plurality of spot markers, for example, a spot marker 612, and the spot browsing bar 62 displays a plurality of spot pictures, for example, a spot picture 622 for representing the spots appeared in the electronic map 61. The electronic map 61 further displays a locate option 614, and when the user clicks the locate option 614, the electronic device controls the mobile device to execute the positioning function to obtain the current location of the mobile device, marks the current location on the electronic map 61 by a device marker 616, and shifts the display area of the electronic map 61 to locate the device marker 616 at the center of the electronic map 61.

On the other hand, the locate option may also be displayed in the spot information editing block. FIG. 7 is an example of a spot information editing block according to an example of the application. Referring to FIG. 7, the spot information editing block 70 of the present example is, for example, displayed on the spot information browsing interface, in which besides a plurality of editing fields of the spot information is displayed to facilitate the user editing various information, a locate option 704 is displayed on an electronic map 702. When the user clicks the locate option 704, the electronic device controls the mobile device to locate a current location, marks the current location in the electronic map 702 by a device marker 706, and shifts a display area of the electronic map to locate the device marker 706 at the center of the electronic map 702.

The spot information browsing interface, is, for example, provided by an application program installed in the electronic device, and when the user executes the application program, the electronic device generates the spot information browsing interface. Moreover, the spot information browsing interface may also be provided by a webpage server at a service end, and when the electronic device connects the webpage server, the electronic device downloads a webpage containing the spot information browsing interface from the webpage server, and displays it on a webpage browser. Moreover, the spot information browsing interface may further comprise a plurality of functional options to facilitate the user browsing, editing, and sharing the spot information.

Figure 8:
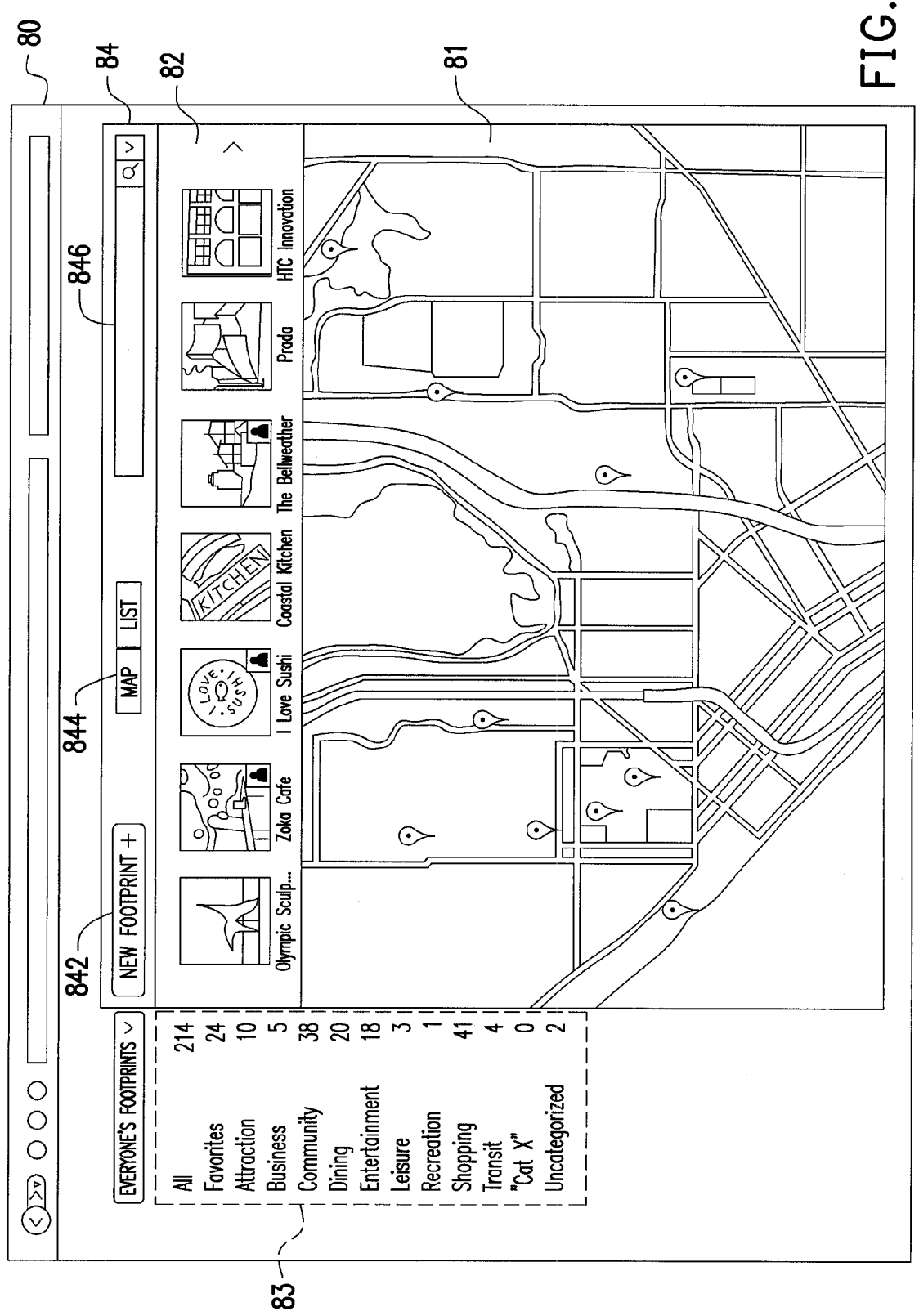
FIG. 8 is an example of a spot information browsing interface according to an example of the application.

For example, FIG. 8 is an example of a spot information browsing interface according to an example of the application. Referring to FIG. 8, the spot information browsing interface 80 of the present example is displayed on the webpage browser of the electronic device in a form of webpage. In the spot information browsing interface 80, besides an electronic map 81 and a spot browsing bar 82 are displayed, a category menu 83 of the spot information and a function menu 84 of the spot information are also displayed. The category menu 83 comprises device preset categories or categories set by the user, and the spot information retrieved by the electronic device are categorized into categories of All, Favorites, Attraction, Business, Community, Dining, Entertainment, Leisure, Recreation, Shopping, Transit, "Cat X," and Uncategorized, etc. When the user selects a certain category in the category menu 83, the electronic device correspondingly displays all spot information under such category in the electronic map 81 and the spot browsing bar 82.

Furthermore, the function menu 84 may comprise an add option 842, a browsing mode option 844, and a search field 846. When the user clicks the add option 842, the electronic device may display a spot information editing block on the spot information browsing interface 80 to facilitate the user editing the spot information to be added. When the user clicks the browsing mode option 844, the browsing mode is switched between a map browsing mode and a list browsing mode. When the user clicks the search field 846, the user may input keywords into the search field 846 to search related spot information.

Regarding the above method for browsing the spot information, the application also provides a corresponding hardware device, so that the method may be applied to an electronic device having a display screen such as a desktop computer, a notebook computer, a flat panel computer, or a smart phone, etc. Another example is provided below for further descriptions.

Figure 9:
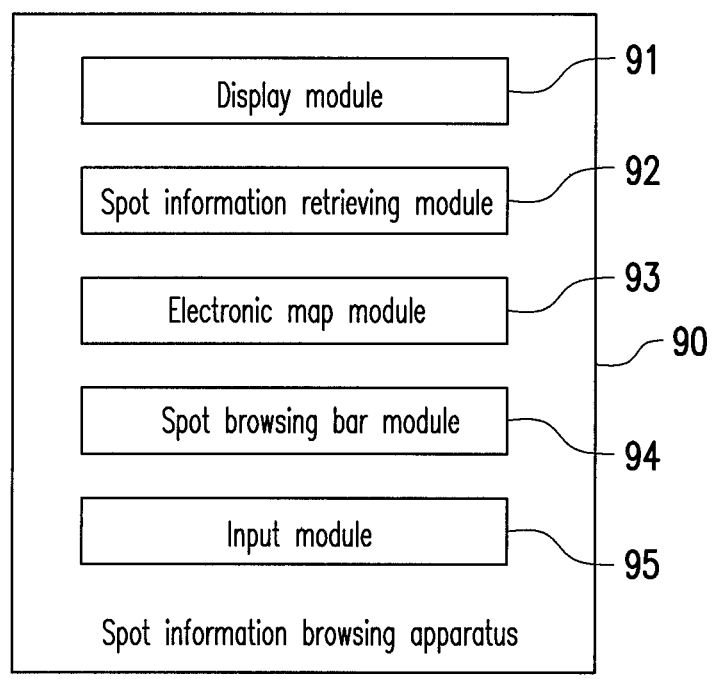
FIG. 9 is a block diagram of an apparatus for browsing spot information according to an example of the application.

FIG. 9 is a block diagram of an apparatus for browsing spot information according to an example of the application. Referring to FIG. 9, the apparatus 90 for browsing spot information is, for example, an electronic device having a display screen such as a desktop computer, a notebook computer, a flat panel computer, or a smart phone, etc., which comprises a display module 91, a spot information retrieving module 92, an electronic map module 93, a spot browsing bar module 94, and an input module 95, and functions thereof are respectively described as follows.

The display module 91 is, for example, a liquid crystal display (LCD), a light-emitting diode (LED) display, a field emission display (FED), or other types of display, which is used for displaying images of the apparatus 90 for browsing spot information.

The spot information retrieving module 92 is used for retrieving a plurality of spot information, where each of the spot information at least comprises a spot picture and a spot location of a spot. The spot information retrieving module 92 is, for example, connected to a website to retrieve spot information shared by multiple members of the website. In another example, the spot information further comprises a spot name of the spot and a picture of the member sharing the spot information.

The electronic map module 93 is used for displaying an electronic map on the display module 91, and marking a spot marker at the spot location of each spot information on the electronic map.

The spot browsing bar module 94 is used for displaying a spot browsing bar on a side of the electronic map displayed by the display module 91 and sequentially displaying the spot pictures of the spot information in the spot browsing bar. The spot browsing bar module 94 may further mark a spot name of each spot information near the spot picture, and display the member picture of the member sharing the spot information at a corner of the spot picture.

The input module 95 is, for example, a keyboard, a mouse, or a touch panel, which is used for receiving a select operation from a user. When the input module 95 receives a select operation of a certain spot marker on the electronic map displayed by the electronic map module 93 from the user, the spot browsing bar module 94 scrolls the spot browsing bar to show the spot picture corresponding to the selected spot marker. In detail, the spot browsing bar module 94 may scroll the spot browsing bar to scroll the spot picture corresponding to the selected spot marker to a display area of the spot browsing bar. Moreover, the spot browsing bar module 94 may frame the spot picture corresponding to the selected spot marker by an outer frame, or highlight the spot picture corresponding to the selected spot marker by darkening the other spot pictures in the spot browsing bar.

Furthermore, when the input module 95 receives a select operation of a certain spot picture in the spot browsing bar from the user, the electronic map module 93 may shift a display area of the electronic map to locate the spot marker corresponding to the selected spot picture at a center of the electronic map.

It should be notice that the apparatus 90 for browsing spot information may further comprise a spot note module (not shown) and a spot information editing module (not shown). When the input module 95 receives a select operation of a certain spot marker in the electronic map from the user, the spot note module extendedly displays a spot note block from the selected spot marker to display related information of the spot. Furthermore, the spot information editing module is used for displaying a spot information editing block when the input module 95 receives a select operation of an add option in the spot note block from the user, so as to facilitate the user editing the spot information, and adding the edited spot information to be a favorite spot of the user. Implementations of the spot note block and the spot information editing block have been described in detail in the aforementioned example, so that detailed descriptions thereof are not repeated.

Moreover, the apparatus 90 for browsing spot information may further comprise a connection unit (not shown) and a control module (not shown). The connection unit is used for connecting the electronic device and the mobile device, and the control module is used for controlling the mobile device through the connection unit to execute a positioning function to obtain a current location of the mobile device when the input module 95 receives a select operation of a locate option displayed by the display module 91 from the user. In this way, the electronic map module 93 may mark the current location of the mobile device on the electronic map by a device marker, and shift a display area of the electronic map to locate the device marker at a center of the electronic map. The locate option may be displayed in the electronic map or displayed in the spot information editing block, which is not limited by the application.

The application provides a computer-readable medium, which records a computer program to be loaded into a mobile device to execute the steps of the aforementioned method for browsing spot information. The computer program is basically composed of a plurality of program instructions (for example, an organization chart establishing program instruction, a table approving program instruction, a setting program instruction, and a deployment program instruction, etc), and these program instructions are loaded into the mobile device and executed by the same to accomplish various steps of the method for browsing spot information and various functions of the apparatus for browsing spot information described above.

In summary, in the method, the system, the apparatus and the computer-readable medium for browsing spot information of the application, the spot information is simultaneously marked in the electronic map and the spot browsing bar, and corresponding relation between the spot markers in the electronic map and the spot pictures in the spot browsing bar are established, so that the user can conveniently select the interested spot from the electronic map or the spot browsing bar, and browse, edit, and share related information of the spot.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method for browsing spot information, adapted to an electronic device, the method for browsing spot information comprising:
   the electronic device connecting to a social network website or spot sharing website;
   retrieving a plurality of spot information comprising at least a custom created spot information by a user of the electronic device and a spot information shared by the social network or the spot sharing website, wherein each of the spot information comprises a spot picture and a spot location of a spot;
   displaying an electronic map, and marking a spot marker at the spot location of each spot information on the electronic map;
   displaying a spot browsing bar on a side of the electronic map, and sequentially displaying the spot pictures of the spot information in the spot browsing bar; and
   when a select operation of one of the spot markers on the electronic map is received, scrolling the spot browsing bar to show the spot picture corresponding to the selected spot marker.

2. The method of claim 1, wherein the step of retrieving the spot information comprises:
   connecting to the social network website; and
   retrieving spot information shared by a plurality of contacts of the user from the social network website.

3. The method of claim 2, wherein the spot information comprises a spot name of the spot and a member picture of the member sharing the spot information.

4. The method of claim 1, wherein when the select operation of one of the spot markers on the electronic map is received, the method further comprises:
   extendedly displaying a spot note block from the selected spot marker, wherein the spot note block displays the spot picture corresponding to the selected spot marker.

5. The method of claim 4, wherein after the step of extendedly displaying the spot note block from the selected spot marker, the method further comprises:
   displaying an add option for adding the spot information to be a favorite spot, and displaying a send option for sending the spot information to other members or contacts.

6. The method of claim 5, wherein after the step of extendedly displaying the spot note block from the selected spot marker, the method further comprises:
   displaying a spot information editing block for editing the spot information when a select operation of the add option in the spot note block is received; and
   adding the edited spot information to be a favorite spot when a select operation of an OK option in the spot information editing block is received.

7. The method of claim 1, wherein the step of scrolling the spot browsing bar to show the spot picture corresponding to the selected spot marker comprises:
   scrolling the spot browsing bar to scroll the spot picture corresponding to the selected spot marker to a display area of the spot browsing bar.

8. The method of claim 1, wherein after the step of displaying the electronic map and the spot browsing bar, the method further comprises:
   when a select operation of one of the spot pictures in the spot browsing bar is received, shifting a display area of the electronic map to locate the spot marker corresponding to the selected spot picture at a center of the electronic map.

9. The method of claim 1, wherein after the step of displaying the electronic map and the spot browsing bar, the method further comprises:
   receiving a select operation of an add option;
   controlling a mobile device connected to the electronic device to execute a positioning function to obtain a current location of the mobile device; and
   displaying a spot information editing block, and marking the current location of the mobile device on the electronic map in the spot information editing block by a device marker.

10. An apparatus for browsing spot information, comprising:
    a display module;
    a spot information retrieving module, configured to connect to a social network website or spot sharing website and to retrieve a plurality of spot information comprising at least a custom created spot information by a user of the electronic device and a spot information shared by the social network or the spot sharing website, wherein each of the spot information comprises a spot picture and a spot location of a spot;

an electronic map module, configured to display an electronic map on the display module, and mark a spot marker at the spot location of each spot information on the electronic map;

a spot browsing bar module, configured to display a spot browsing bar on a side of the electronic map, and sequentially displaying the spot pictures of the spot information in the spot browsing bar; and an input module, configured to receive a select operation, wherein when the input module receives the select operation of one of the spot markers on the electronic map displayed by the electronic map module, the spot browsing bar module scrolls the spot browsing bar to show the spot picture corresponding to the selected spot marker.

11. The apparatus of claim 10, wherein the spot information retrieving module is connected to the social network website to retrieve spot information shared by a plurality of contacts of the user from the social network website.

12. The apparatus of claim 11, wherein the spot information comprises a spot name of the spot and a member picture of the member sharing the spot information.

13. The apparatus of claim 12, further comprising:
a spot note module, wherein when the input module receives the select operation of one of the spot markers on the electronic map, the spot note module extendedly displays a spot note block from the selected spot marker, and the spot note block displays the spot picture corresponding to the selected spot marker.

14. The apparatus of claim 13, wherein the spot note module further displays an add option in the spot note block for adding the spot information to be a favorite spot, and displays a send option in the spot note block for sending the spot information to other members or contacts.

15. The apparatus of claim 14, further comprising:
a spot information editing module, configured to display a spot information editing block for editing the spot information when the input module receives the select operation of the add option in the spot note block, and add the edited spot information to be a favorite spot when the input module receives the select operation of an OK option in the spot information editing block.

16. The apparatus of claim 10, wherein when the input module receives the select operation of one of the spot markers on the electronic map displayed by the electronic map module, the spot browsing bar module scrolls the spot browsing bar to scroll the spot picture corresponding to the selected spot marker to a display area of the spot browsing bar.

17. The apparatus of claim 10, further comprising:
a connection unit, configured to connect a mobile device; and
a control module, configured to control the mobile device to execute a positioning function to obtain a current location of the mobile device when the input module receives the select operation of a locate option,
wherein the electronic map module further marks the current location of the mobile device on the electronic map by a device marker, and shifts a display area of the electronic map to locate the device marker at a center of the electronic map.

18. The apparatus of claim 10, further comprising:
a connection unit, configured to connect a mobile device;
a control module, configured to control the mobile device to execute a positioning function to obtain a current location of the mobile device when the input module receives the select operation of a locate option; and
a spot information editing module, configured to display a spot information editing block, and mark the current location of the mobile device on the electronic map in the spot information editing block by a device marker.

19. A non-transitory computer-readable medium, recording program instructions executed by an electronic device to perform:
connecting to a social network website or spot sharing website by the electronic device;
retrieving a plurality of spot information comprising at least a custom created spot information by a user of the electronic device and a spot information shared by the social network or the spot sharing website, wherein each of the spot information comprises a spot picture and a spot location of a spot;
displaying an electronic map, and marking a spot marker at the spot location of each spot information on the electronic map;
displaying a spot browsing bar on a side of the electronic map, and sequentially displaying the spot pictures of the spot information in the spot browsing bar; and
when a select operation of one of the spot markers on the electronic map is received, scrolling the spot browsing bar to show the spot picture corresponding to the selected spot marker.

20. A system for browsing spot information, comprising:
a spot information retrieving tool, for connecting to a social network website or spot sharing website and retrieving a plurality of spot information comprising at least a custom created spot information by a user of the electronic device and a spot information shared by the social network or the spot sharing website, wherein each of the spot information comprises a spot picture and a spot location of a spot;
an electronic map tool, for displaying an electronic map, and marking a spot marker at the spot location of each spot information on the electronic map;
a spot browsing bar tool, for displaying a spot browsing bar on a side of the electronic map, and sequentially displaying the spot pictures of the spot information in the spot browsing bar; and
an input tool, for receiving a select operation,
wherein when the select operation of one of the spot markers on the electronic map displayed by the electronic map tool is received, the spot browsing bar tool scrolls the spot browsing bar to show the spot picture corresponding to the selected spot marker.
an input tool, for receiving a select operation from a user,
wherein when the select operation of one of the spot markers on the electronic map displayed by the electronic map tool is received from a user, the spot browsing bar tool rolls the spot browsing bar to mark the spot picture corresponding to the selected spot marker.

* * * * *